United States Patent [19]

Gier

[11] Patent Number: 5,152,972
[45] Date of Patent: Oct. 6, 1992

[54] PROCESS FOR PRODUCING MOLECULAR SIEVES AND NOVEL MOLECULAR SIEVE COMPOSITIONS

[75] Inventor: Thurman E. Gier, Chadds Ford, Pa.

[73] Assignee: E. I. Du Pont de Nemours and Company, Wilmington, Del.

[21] Appl. No.: 576,040

[22] Filed: Aug. 31, 1990

[51] Int. Cl.$^5$ ............................................. C01B 33/34
[52] U.S. Cl. ..................................... 423/710; 423/305; 423/306; 423/713
[58] Field of Search ............... 423/305, 306, 328, 329; 502/208, 214

[56] References Cited

U.S. PATENT DOCUMENTS

| | | | |
|---|---|---|---|
| 4,310,440 | 1/1982 | Wilson et al. | 252/435 |
| 4,329,328 | 5/1982 | McAnespie et al. | 423/333 |
| 4,440,871 | 4/1984 | Lok et al. | 502/214 |
| 4,670,617 | 6/1987 | De Simone et al. | 585/467 |
| 4,737,353 | 4/1988 | Flanigen et al. | 423/306 |
| 4,744,970 | 5/1988 | Lok et al. | 423/306 |
| 4,894,213 | 1/1990 | Flanigen et al. | 423/328 |
| 4,913,795 | 4/1990 | Valyocsik | 423/306 |
| 4,913,888 | 4/1990 | Flanigen et al. | 423/306 |
| 4,935,216 | 6/1990 | Lok et al. | 423/328 |
| 4,940,570 | 7/1990 | Flanigen et al. | 423/306 |

OTHER PUBLICATIONS

R. Szostak, Molecular Sieves, Principles of Synthesis and Identification, pp. 2-6 and Chapter 4, pp. 205-281.
R. C. Rouse et al., Neues Jahr. Mineral Monatsh, pp. 433-440 (1987).
G. Harvey and W. M. Meier in P. A. Jacobs and R. A. Van Santen, Eds., Studies in Surface Science and Catalysis, vol. 49, Zeolites: Facts, Figures, Future, Part A. Proc. of the 8th Int. Zeolite. Conf. Amsterdam, Jul., 1989, Elsevier, Amsterdam, 1989, pp. 411-420.

Primary Examiner—R. Bruce Breneman

[57] ABSTRACT

Novel molecular sieves are disclosed which are oxides of (a) an alkali metal, an alkaline earth metal and/or ammonium, (b) beryllium, cobalt and/or zinc, and (c) phosphorous, arsenic and/or vanadium, and optionally contain water. These zeolite-like materials, which contain little or no aluminum or silicon, can be made by a novel low temperature process. The molecular sieves are useful as ion exchange resins.

32 Claims, No Drawings

PROCESS FOR PRODUCING MOLECULAR SIEVES AND NOVEL MOLECULAR SIEVE COMPOSITIONS

FIELD OF THE INVENTION

This invention relates to molecular sieves and more particularly to zeolite-like molecular sieves which contain little or no aluminum or silicon, and processes for their production.

BACKGROUND OF THE INVENTION

The term "molecular sieve" has been used to describe materials which may be used to separate components of a mixture on the basis of molecular size and shape, and has been used in conjunction with such materials as silicas, metalloaluminates, and aluminophosphates, as well as with other materials having a regular framework structure suitable for such separation. See, e.g., R. Szostak, Molecular Sieves, Principles of Synthesis and Identification, Van Nostrand Reinhold, New York, 1989, pages 2–6. Szostak (supra) at page 3–4 provides a list of elements that may form molecular sieve framework structures in place of aluminum or silicon. However, no mention is made of any particular molecular sieve material in which all of the silicon and aluminum is replaced by other elements, and no directions are provided for making such a material. However, see Szostak, (supra) Ch. 4, for a listing and discussion of such molecular sieves that have been made.

Zeolites, and zeolite-like materials, sometimes also called molecular sieves, are well known in the art. By far the most common of these materials are the framework aluminosilicates, which occur naturally, and are also made by synthetic methods. Certain elements, such as boron, gallium, germanium, phosphorous, titanium, beryllium, zinc, and others have been substituted in part, or less commonly, in whole for either the silicon or aluminum in zeolite and zeolite-like structures. See, e.g., R. Szostak, supra, Ch. 4., pages 205–281. In addition to the silicon and aluminum that compositionally define the zeolite molecular sieves, other cations (which need not be isoelectronic with silicon or aluminum) can also occupy framework sites.

U.S. Pat. No. 4,329,328 describes the preparation of a molecular sieve containing a "sodium zinco/stanno/titano-silicate", which can be thought of as a zeolite in which the aluminum has been substituted for by zinc, tin or titanium. U.S. Pat. No. 4,670,617 describes a molecular sieve material containing zinc but no aluminum. The molecular sieve materials of these patents contain substantial amounts of silicon.

U.S. Pat. No. 4,440,871 and U.S. Pat. No. 4,310,440 describe molecular sieve materials in which phosphorous has been respectively substituted for some or all of the silicon in zeolite-like materials. Substantial amounts of aluminum are present in these compositions.

Much less common are molecular sieves in which all, or almost all of the silicon and aluminum have been substituted for by other elements. R. C. Rouse, et. al., Neues Jahr. Mineral. Monatsh. pages 433–440 (1987), report the discovery of a naturally occurring "zeolite" which contains beryllium and phosphorous, and no silicon or aluminum. G. Harvey and W. M. Meier in P. A. Jacobs and R. A. van Santen, Eds., Studies in Surface Science and Catalysis, Vol. 49, Zeolites: Facts, Figures, Future, Part. A. Proc. of the 8th Int. Zeolite. Conf., Amsterdam, Jul., 1989, Elsevier, Amsterdam, 1989, pages 411–420, report the synthesis of several zeolite-type materials containing beryllium and phosphorous, but no aluminum or silicon. These materials were prepared by hydrothermal methods at temperatures of 100°–200° C.

It is well known in the art that molecular sieves are useful for ion exchange, drying, catalysis, and purification and separation of various compounds.

SUMMARY OF THE INVENTION

A novel process is provided in accordance with this invention for the production of molecular sieves. This process comprises the steps of: (a) forming a mixture consisting essentially of reactive sources of $M_{2/x}O$, AO and $T_2O_5$ and water, wherein M is selected from the group consisting of alkali metals, alkaline earth metals and ammonium, A is selected from the group consisting of beryllium, cobalt and zinc, T is selected from the group consisting of phosphorous, arsenic and vanadium, and x is the average ionic charge of M in the mixture, wherein said M, A and T are present in the approximate proportions expressed in terms of a molar ratio of oxides as $0.5$–$3$ $M_{2/x}O:AO:0.5$–$3$ $T_2O_5$, and wherein said mixture contains from about 10 to about 200 moles of water per mole of A; provided that up to about 10 atom percent of the total amount of said A and said T present in the mixture may be replaced by aluminum or silicon; and (b) crystallizing the mixture at a temperature from the freezing point of the mixture to about 90° C. for a period of time sufficient to form a molecular sieve composition containing M, A, T and oxygen. Certain molecular sieve compositions which are products of this process are also provided in accordance with this invention.

This invention provides a crystalline molecular sieve composition having the approximate formula $M(ATO_4)_x \cdot yH_2O$, wherein M is selected from the group consisting of alkali metals, alkaline earth metals and ammonium, A is selected from the group consisting of beryllium, cobalt and zinc, T is selected from the group consisting of phosphorous, arsenic and vanadium, x is the average ionic charge of said M, and y is from zero to about 10; provided that up to about 10 atom percent of said A and said T combined may be replaced by aluminum or silicon; and provided that when A is beryllium, T is not phosphorous.

This invention also provides certain molecular sieve compositions, including certain beryllophosphate molecular sieves, which are defined by their X-ray powder diffraction patterns.

It is the object of this invention to provide a process for the synthesis of novel molecular sieve materials containing novel combinations of elements in the crystalline framework of the molecular sieve. Specifically the molecular sieves contain relatively little or no silicon or aluminum, and do contain beryllium, cobalt or zinc, in combination with phosphorous, arsenic or vanadium (all of these elements being present as oxides).

It is also an object of this invention to provide novel molecular sieves containing these combinations of elements.

These and other objects of the invention will become evident from the detailed description which follows.

DETAILS OF THE INVENTION

This invention provides a process for the production of molecular sieves. The term "molecular sieve" is used herein in general conformance with the definition adopted by R. Szostak (supra), pages 2-6, which is hereby incorporated into this application by reference. The molecular sieves produced by the process of this invention however contain at most only limited amounts of aluminum and/or silicon, while most of the molecular sieves disclosed in Szostak allow substantial amounts of silicon and/or aluminum in a molecular sieve. The molecular sieves of this invention are considered similar to zeolites, but do not contain as much silicon or aluminum as the "classical" zeolites, and in most embodiments do not contain any silicon or aluminum. The molecular sieves of this invention are oxides of the respective elements.

Molecular sieves are made in accordance with this invention by a novel hydrothermal process in which compounds of the various elements necessary to form the molecular sieve are mixed in the presence of water and the molecular sieve is then crystallized from said mixture at relatively mild temperatures. The process comprises the steps of: (a) forming a mixture consisting essentially of reactive sources of $M_{2/x}O$, AO and $T_2O_5$ and water, wherein M is selected from the group consisting of alkali metals, alkaline earth metals and ammonium, A is selected from the group consisting of beryllium, cobalt and zinc, T is selected from the group consisting of phosphorous, arsenic and vanadium, and x is the average ionic charge of M in the mixture, wherein said M, A and T are present in the approximate proportions expressed in terms of a molar ratio of oxides as 0.5-3 $M_{2/x}O$:AO:0.5-3 $T_2O_5$, and wherein said mixture contains from about 10 to about 200 moles of water per mole of A; provided that up to about 10 atom percent of the total amount of said A and said T present in the mixture may be replaced by aluminum or silicon; and (b) crystallizing the mixture at a temperature from the freezing point of the mixture to about 90° C. for a period of time sufficient to form a molecular sieve composition containing M, A, T and oxygen.

The M, A, and T components and water in the mixture can be represented in terms of the molar oxide ratio as 0.5-3($M_{2/x}O$):(AO):0.5-3($T_2O_5$):10-200 $H_2O$ where x is the average charge of the M ions (e.g., $M_{2/x}O$ is $M_2O$ where M is alkali metal, and $M_{2/x}O$ is MO for alkaline earth metal).

The necessary elements may be in any reactive source (i.e., a compound which will make them available for reaction to form crystals containing M, A, T and oxygen). This generally means a compound which is soluble or partly soluble in water or can be made soluble, as by the addition of an acid. Of course, if little or no aluminum or silicon (or other element) is to be present in the final product, that element should preferably not be part of the compound in which one of the necessary elements resides. Suitable types of compounds in which the necessary elements may be added include, but are not limited to, nitrates, hydroxides, phosphates (or phosphoric acid), vanadates, and arsenates (or arsenic acid). It is preferred to add two of the elements as a single compound, for example an alkali metal phosphate or arsenate, which may be added as such, or formed in situ by the reaction of the appropriate acid and base. Specific examples of compounds and combinations of compounds used are found in the Examples. For many embodiments of this invention, it is preferred that both silicon and aluminum are absent.

It is especially preferred that all the elements (ions) necessary to form the molecular sieve are soluble in the aqueous medium before or at the start of the process. Maximum homogeneity is desirable in order to minimize the formation of multiple phases, or put another way, to obtain a single product. Although the process can be run when one or more of the starting elements is only partially in solution, this usually slows down the process, particularly at the low temperatures used therein. Control of the pH is often particularly useful in achieving a homogeneous starting point.

The reactive sources of M, A and/or T may contain the respective component(s) as either the simple ions, such as sodium or calcium ion for M, or more complex ions that contain the element, such as phosphate, arsenate, and zincate.

Component M is the cation of an alkali metal, an alkaline earth metal, or an ammonium ion. M may be present as one or more of said cations. For many embodiments it is preferred that only one of these be present. By ammonium ion is meant the ammonium ion itself, $NH_4^+$, or ammonium ions with one, two, three or four hydrocarbyl or substituted hydrocarbyl groups attached to the nitrogen atom. In the process of this invention M is typically added to the mixture as a hydroxide or other soluble salt. Preferably, at least a portion of M is added in combination with the T component (e.g., as a phosphate, an arsenate, or vanadate).

Component A is present as one or more of beryllium, cobalt and zinc. For many embodiments, it is preferred that only one of these is present. In the process of this invention A is typically added to the mixture as a nitrate, chloride acetate or other soluble salt.

Component T is present as one or more of phosphorous, arsenic and vanadium. For many embodiments, it is preferred that only one is present. In the process of this invention T is typically added to the mixture as a phosphate, vandadate or arsenate of the M component, or as an acid.

As noted above, relatively small amounts of silicon and/or aluminum may also be present. These may be added in conventional ways, such as silicates or aluminates, to the process. Such methods are known to those skilled in the art. It is often preferred that both silicon and aluminum are absent.

A surprising aspect of this process is that relatively low temperatures, compared to prior art methods for making zeolites, can be used. It is believed that this surprising factor is important in forming many of the molecular sieves described herein. Even with these relatively low temperatures, the time necessary to form the molecular sieve product may be relatively short, as little as a few hours. No maximum reaction time is known, but for practical purposes reaction times range out to about a week, or longer, depending upon the practitioner's patience. It is believed that some of compositions used may form one or more "metastable" molecular sieves, which, upon standing at the process conditions, are converted to another molecular sieve. These metastable molecular sieves may sometimes be isolated by stopping the process at the appropriate point.

The reaction is run at a temperature from the freezing point of the reaction mixture to about 90° C., preferably from about 0° C. to about 80° C., and more preferably from about 0° C. to about 70° C. By the freezing point of the reaction mixture is meant the temperature at which water will solidify from the mixture. This temperature will vary somewhat depending on the concentration of dissolved salts, because of the well known freezing point depression phenomenon. It is very desirable to agitate the process mixture at the start of the process in order to obtain a substantially homogeneous mixture (within the limitations such as component solubility of the particular system). The initial agitation at the start of the process is preferably powerful enough to make as homogeneous a mixture as feasible. After such initial agitation, continued agitation is less important.

The progress of the process towards molecular sieves may be monitored by periodically removing solid material and analyzing it by X-ray diffraction (infra) for the proper (or an anticipated) X-ray diffraction pattern.

This invention also concerns certain molecular sieve compositions. Molecular sieve compositions can be made by the novel process of this invention; and the invention includes molecular sieve compositions which are products of that process. Included in the preferred embodiments for the molecular sieves are compositions which contain the preferred ions (elements), and their combinations described above in connection with the process of this invention. Although a limited amount of aluminum and/or silicon may be present in some embodiments, other embodiments are provided wherein neither silicon nor aluminum is present.

Included in this invention are certain beryllophosphate molecular sieves (e.g., those described in Examples 1 and 6), which can be made by the process provided herein and which are designated (using their codes, which are found in the Examples) DPZ-1A and DPZ-4A. All of these are identified by the d-spacings and the relative intensities of their X-ray diffraction patterns, each of which is given in a Table in the appropriate Example.

Other embodiments include those where A is selected from cobalt and zinc and/or those where T is selected from arsenic and vanadium.

Particularly preferred molecular sieves are (referred to here by their codes, which are found in the Examples, infra): DPZ-1B, DPZ-2A, DPZ-2B, DPZ-3A, DPZ-4B, DPZ-4C, DPZ-4D, DPZ-5A, DPZ-5B, DPZ-5C, DPZ-5D, DPZ-5E, DPZ-6A, DPZ-7A, DPZ-7B, DPZ-8A, DPZ-9A, DPZ-10A, DPZ-11A, DPZ-12A, DPZ-12B and DPZ-13A. All of these are identified by the d-spacings and intensities of their X-ray diffraction patterns, each of which is given in a Table in the appropriate Example.

Crystalline molecular sieve compositions are provided in accordance with this invention which have the approximate formula $M(ATO_4)_x \cdot yH_2O$ where M is selected from the group consisting of alkali metals, alkaline earth metals and ammonium, A is selected from the group consisting of beryllium, cobalt and zinc, T is selected from the group consisting of phosphorous, arsenic and vanadium, x is the average ionic charge of said M, and y is from zero to about 10; provided that up to about 10 atom percent of said A and said T combined can be replaced by aluminum or silicon; and provided that when A is beryllium, T is not phosphorous. Included in the molecular sieve compositions having said essential empirical formula are molecular sieve compositions which can be made by the process provided herein.

The symbol x represents the average ionic charge of the M ions. For alkali metal and ammonium ions x is one, for alkaline earth metals x is two, and for mixtures of alkaline earth metals with either alkali metal or ammonium ions, x is between 1 and 2.

The symbol y represents the relative amount of molecular water in the molecular sieve. Preferably y is about 0.5 to about 3. In some of the molecular sieves, the water may be removed by heating, and in some cases the sieve may be rehydrated by exposure to water.

The term "approximate formula $M(ATO_4)_x \cdot yH_2O$" as used herein means a formula wherein the atomic ratios of M, A and T depart from the ratios thereof in the corresponding emperical formula $M(ATO_4)_x \cdot yH_2O$ by no more than about 10%.

Other materials (e.g., chloride, nitrate, or acetate ions) may be present during formation of the molecular sieves of this invention. These materials may also appear in the molecular sieve products, either as merely occluded (extraneous) material or, in minor (e.g., trace) amounts at various sites in the crystalline structure. It will be understood that although the approximate formula does not specifically recite such constituents, it is not intended that they be excluded in the same sense that hydrogen cations and/or hydroxyl groups are not specifically provided for in the conventional empirical formulae of zeolitic aluminosilicates.

It will also be evident to one skilled in the art that when Si or Al partially replace beryllium, cobalt, zinc, phosphorous, arsenic and/or vanadium, the ratio of M to the total of A and T may change to a limited extent. It will be understood that although the approximate formula does not specifically recite a change in ratio, it is not intended to exclude this limited change in ratio due to the presence of Si or Al.

This invention includes crystalline molecular sieve compositions which are made by the process of this invention and/or have the approximate formula $M(ATO_4)_x \cdot yH_2O$, and which are structural analogues of molecular sieves designated (using their codes which are found in the Examples) DPZ-1A, DPZ-1B, DPZ-2A, DPZ-2B, DPZ-3A, DPZ-4A, DPZ-4B, DPZ-4C, DPZ-4D, DPZ-5A, DPZ-5B, DPZ-5C, DPZ-5D, DPZ-5E, DPZ-6A, DPZ-7A, DPZ-7B, DPZ-8A, DPZ-9A, DPZ-10A, DPZ-11A, DPZ-12A, DPZ-12B and DPZ-13A. The term "structural analogue" as used herein means a composition which has the same type of crystal structure as the respective example composition to which it is structurally analogous, as demonstrated by similar d-spacings in its X-ray powder diffraction pattern (i.e., a structural analogue has an X-ray powder diffraction pattern which differs only slightly in the d-spacings from the diffraction pattern of the composition to which it is structurally analogous). Typically, a structural analogue of an example composition of this invention has the approximate formula $M(ATO_4)_x \cdot yH_2O$ and differs in a minor way from the example composition to which it is structurally analogous (e.g., by partial replacement of an M, A and/or T element with a different M, A and/or T element).

Some of the molecular sieve compositions of this invention have been identified herein as structural analogues of known aluminosilicate framework zeolites. These include the following: Zeolite X (Faujasite; Examples 1 and 2); Zeolite RHO (Examples 3 and 4); Zeolite Li-ABW (Examples 6 through 9); and Sodalite (Examples 16 and 17). Molecular sieve compositions of this invention which have types of crystal structures having no herein identified structural analogue among conventional zeolites include the following: primitive cubic structures (Examples 10 through 14 and 19); body-centered cubic structures (Examples 5, 15, 22 and 23); hexagonal structures (Examples 18 and 24); and tetragonal structures (Examples 20 and 21).

Thus, for example, this invention includes alkali metal, alkaline earth metal and ammonium beryllophosphate molecular sieve compositions and other molecular sieve compositions made by the process of this invention and/or having the approximate formula $M(ATO_4)_x \cdot yH_2O$, which are structural analogues of the molecular sieves designated (using the codes found in Examples 1 and 6) as DPZ-1A and DPZ-4A.

The molecular sieve compositions of this invention are microporous. Typically, the pores have a nominal pore diameter of at least about 3 Å. The pores typically have a nominal pore diameter of 12 Å or less, although materials having larger nominal pore diameters are also considered to be within the scope of this invention.

The molecular sieves of this invention are useful as ion exchange materials. Inasmuch as molecular sieves which are useful as ion exchange materials are generally also useful for catalysts and for separations of compounds, the molecular sieve compositions of this invention are potentially useful in these areas as well. Example 1 illustrates the use of one of these molecular sieves as an ion exchange agent.

Practice of the invention will become further apparent from the following non-limiting Examples.

EXAMPLES

In the following Examples, each novel molecular sieve is denominated by a code, which is DPZ-nw, where n is a number specific to a structural class, and w is a letter specific to a particular species. Such a nomenclature is common for molecular sieves (and zeolites). The "d" spacings of the characteristic X-ray powder diffraction patterns of the molecular sieves specify their structure. The relative intensities of the X-ray diffraction patterns (i.e., the intensity, I, at a particular angle in the pattern, divided by the intensity, $I_o$, at the angle of highest intensity) are also characteristic of the molecular sieve. However, it is well known in the art that the relative intensity can vary somewhat based upon sample preparation. Thus for two samples of the same molecular sieve material, the "d" spacing will be the same and the relative intensities will be about the same. It will also be evident that although the Examples do not provide all possible d-spacings for each material, a molecular sieve of the same material as a molecular sieve in an Example will have at least the d-spacings provided in that Example. The molecular sieves of the Examples are considered to be specified completely by the "d" spacings and relative intensities in the characteristic X-ray powder diffraction patterns, where provided. The patterns were obtained on a Scintag PADX diffractometer operating in $\theta - \theta$ geometry with Cu K$\alpha$ radiation ($\lambda = 1.5402$ Å). Each pattern was subjected to background correction and the peaks were located and corrected using Si as an internal standard. The patterns were indexed and refined using a least squares fit of the data.

EXAMPLE 1

Preparation of DPZ-1A

Faujasite: Zeolite X Analog

To a 250 cc Teflon ® bottle was added 41.88 g of a 2M Be(NO$_3$)$_2$ solution and 25.14 g of a 4M H$_3$PO$_4$ solution. After shaking the clear solution to homogenize the mixture, 67.08 g of a 4M NaOH solution was added rapidly. A gel formed, which on shaking transformed to a thick sludge and then to a creamy, milky slurry. The bottle was heated to 70° C. for 12 hours (pH = 6.5) and the crystalline product was then filtered off, washed with water and air dried. 11.57 g of free-flowing white powder were recovered. The product from a similar experiment showed a loss on ignition (250°–275° C.) of 22%. The material exhibited a distinctive X-ray powder diffraction pattern which could be indexed cleanly on the basis of a face centered cube, a = 23.383 Å indicating that DPZ-1A is a beryllophosphate structural analogue of the alumino-silicate mineral, Faujasite (Zeolite X). The X-ray diffraction pattern for DPZ-1A is tabulated below in Table A.

TABLE A

DPZ-1A
LISTING BY DECREASING INTENSITY

| 2THETA | d | 100 I/$I_o$ |
|---|---|---|
| 6.540 | 13.5035 | 100 |
| 33.167 | 2.6988 | 40 |
| 24.948 | 3.5663 | 31 |
| 24.048 | 3.6977 | 29 |
| 22.487 | 3.9506 | 29 |
| 10.697 | 8.2636 | 28 |
| 12.557 | 7.0435 | 24 |
| 34.278 | 2.6139 | 23 |
| 16.517 | 5.3626 | 16 |
| 32.463 | 2.7558 | 13 |
| 43.788 | 2.0657 | 11 |
| 40.053 | 2.2493 | 11 |
| 29.327 | 3.0429 | 8 |
| 36.018 | 2.4915 | 6 |
| 57.199 | 1.6092 | 6 |
| 36.648 | 2.4501 | 6 |
| 44.298 | 2.0431 | 5 |
| 34.938 | 2.5660 | 5 |
| 31.337 | 2.8521 | 5 |
| 45.738 | 1.9821 | 5 |
| 55.548 | 1.6530 | 5 |
| 41.598 | 2.1693 | 5 |
| 25.208 | 3.5300 | 4 |
| 37.638 | 2.3879 | 3 |
| 19.715 | 4.4994 | 3 |
| 48.438 | 1.8777 | 3 |
| 21.467 | 4.1360 | 3 |
| 39.318 | 2.2897 | 3 |
| 35.148 | 2.5512 | 2 |
| 49.938 | 1.8248 | 2 |
| 53.148 | 1.7219 | 2 |
| 34.487 | 2.5985 | 2 |
| 50.568 | 1.8035 | 2 |
| 15.137 | 5.8483 | 2 |
| 42.408 | 2.1297 | 2 |
| 51.822 | 1.7628 | 2 |
| 27.198 | 3.2762 | 2 |
| 53.567 | 1.7094 | 2 |
| 52.338 | 1.7466 | 2 |
| 49.758 | 1.8310 | 2 |
| 39.828 | 2.2615 | 2 |
| 41.361 | 2.1812 | 2 |
| 31.907 | 2.8025 | 1 |
| 30.558 | 2.9232 | 1 |
| 54.783 | 1.6743 | 1 |
| 24.257 | 3.6662 | 1 |
| 48.798 | 1.8647 | 1 |
| 32.597 | 2.7447 | 1 |
| 47.898 | 1.8976 | 1 |
| 58.369 | 1.5797 | 1 |

Ion Exchange Using DPZ-1A

The sodium was removed from the structure without loss of crystallinity by ion-exchanging with aqueous cadmium nitrate; the unit cell decreased slightly (a = 23.255 Å) and the intensity of the diffraction pattern lines shifted dramatically from the parent material. In turn, this cadmium exchanged material was treated with hydrogen sulfide to form a micro-composite structure of cadmium sulfide within the open framework. These chemical characteristics are further indication of the close relationship between this phase and Zeolite X.

EXAMPLE 2

Preparation of DPZ-1B (Faujasite: Zeolite X Analog

To a 125 cc Teflon® bottle was added 19.16 g of 4M $H_3PO_4$, 9.14 g of 4M NaOH, and 48.83 g of a 25% solution of tetramethylammonium hydroxide in water. The shaken clear solution was cooled to about 4° C. in a refrigerator and 31.04 g of a pre-cooled (4° C.) 2M $Zn(NO_3)_2$ solution was added rapidly. Thorough shaking converted the initial gel to a sludge which then transformed to a milky slurry (pH=7.5). The container was returned to a refrigerator for five hours after which time the solids were well settled. Recovery of the solids with the technique of Example 1 gave 10.55 g of a free-flowing white powder possessing the distinctive X-ray diffraction pattern of Faujasite, a=25.213 Å. The X-ray diffraction pattern measured for DPZ-1B is tabulated below in Table B. Heating the powder to 175° C. resulted in the loss of 15% water; further heating to 500° C. caused an additional 5% loss of tetramethylammonium decomposition products and the material lost crystallinity.

TABLE B

| DPZ-1B LISTING BY DECREASING INTENSITY | | |
|---|---|---|
| 2THETA | d | 100 $I/I_o$ |
| 6.046 | 14.6073 | 100 |
| 30.661 | 2.9135 | 51 |
| 26.431 | 3.3694 | 44 |
| 11.610 | 7.6157 | 38 |
| 9.900 | 8.9269 | 38 |
| 23.101 | 3.8471 | 36 |
| 15.300 | 5.7863 | 32 |
| 33.301 | 2.6883 | 25 |
| 31.711 | 2.8194 | 23 |
| 22.261 | 3.9903 | 22 |
| 30.031 | 2.9732 | 18 |
| 28.951 | 3.0816 | 13 |
| 18.254 | 4.8560 | 13 |
| 27.121 | 3.2852 | 11 |
| 33.871 | 2.6444 | 11 |
| 34.819 | 2.5745 | 10 |
| 36.302 | 2.4727 | 10 |
| 20.791 | 4.2690 | 7 |
| 19.891 | 4.4601 | 7 |
| 40.922 | 2.2036 | 7 |
| 39.572 | 2.2756 | 7 |
| 37.009 | 2.4270 | 7 |
| 42.992 | 2.1021 | 7 |
| 48.243 | 1.8849 | 6 |
| 35.402 | 2.5335 | 6 |
| 32.316 | 2.7680 | 6 |
| 52.667 | 1.7365 | 6 |
| 54.813 | 1.6734 | 6 |
| 41.732 | 2.1626 | 5 |
| 23.371 | 3.8032 | 5 |
| 56.866 | 1.6178 | 5 |
| 51.176 | 1.7835 | 5 |
| 48.948 | 1.8594 | 5 |
| 25.171 | 3.5352 | 4 |
| 47.792 | 1.9016 | 4 |
| 50.493 | 1.8060 | 4 |
| 43.472 | 2.0800 | 4 |
| 46.639 | 1.9459 | 4 |
| 47.080 | 1.9287 | 3 |
| 24.451 | 3.6376 | 3 |
| 57.904 | 1.5913 | 3 |
| 21.091 | 4.2090 | 3 |

TABLE B-continued

| DPZ-1B LISTING BY DECREASING INTENSITY | | |
|---|---|---|
| 2THETA | d | 100 $I/I_o$ |
| 30.901 | 2.8914 | 3 |
| 57.484 | 1.6019 | 3 |
| 46.053 | 1.9693 | 3 |
| 53.343 | 1.7161 | 3 |
| 32.491 | 2.7535 | 3 |
| 44.702 | 2.0256 | 3 |
| 55.443 | 1.6559 | 3 |
| 55.923 | 1.6428 | 2 |
| 50.060 | 1.8206 | 2 |
| 38.426 | 2.3407 | 2 |
| 52.233 | 1.7499 | 2 |
| 42.212 | 2.1391 | 2 |
| 36.842 | 2.4377 | 2 |
| 49.368 | 1.8445 | 2 |
| 41.072 | 2.1959 | 2 |
| 44.222 | 2.0465 | 2 |
| 36.422 | 2.4648 | 2 |
| 35.522 | 2.5252 | 2 |
| 51.753 | 1.7650 | 2 |
| 39.062 | 2.3041 | 2 |
| 30.271 | 2.9501 | 2 |

EXAMPLE 3

Preparation of DPZ-2A

Zeolite RHO Analog

To a Teflon® bottle was added 6.74 g of 4M $H_3AsO_4$, 10 cc of water, and 9.45 g of a 50% aqueous RbOH solution. After shaking to homogenize the clear solution, 6.98 g 2M $Be(NO_3)_2$ solution was added rapidly. Shaking the resulting gel converted it to a loose milk (pH=7.5) which did not settle in a day at ambient conditions. Heating the reaction to 70° C. for two days caused essentially complete crystallization and 2.85 g of a white very fine powder were recovered using the recovery techniques of Example 1. The powder showed a clean diffraction pattern indexing as body-centered cubic with a=14.236 Å, indicating its close structural similarity to Zeolite RHO. The X-ray diffraction pattern measured for DPZ-2A is tabulated below in Table C. The LOI (Loss on Ignition) at 650° C. was 9% with serious structure instability, but essentially all the water was lost at 500° C. and the dehydrated framework was still intact, a=14.036 Å.

TABLE C

| DPZ-2A LISTING BY DECREASING INTENSITY | | |
|---|---|---|
| 2THETA | d | 100 $I/I_o$ |
| 23.349 | 3.8067 | 100 |
| 27.999 | 3.1841 | 95 |
| 26.529 | 3.3571 | 91 |
| 29.409 | 3.0346 | 88 |
| 34.479 | 2.5991 | 58 |
| 32.019 | 2.7930 | 54 |
| 30.729 | 2.9072 | 45 |
| 8.769 | 10.0755 | 36 |
| 19.719 | 4.4984 | 33 |
| 50.439 | 1.8078 | 22 |
| 38.949 | 2.3105 | 21 |
| 44.979 | 2.0138 | 21 |
| 15.249 | 5.8055 | 17 |
| 52.988 | 1.7267 | 15 |
| 55.478 | 1.6550 | 14 |
| 46.839 | 1.9381 | 14 |
| 43.059 | 2.0990 | 14 |
| 41.049 | 2.1970 | 13 |
| 42.069 | 2.1461 | 12 |
| 54.668 | 1.6775 | 11 |
| 47.769 | 1.9025 | 11 |

TABLE C-continued

| | DPZ-2A LISTING BY DECREASING INTENSITY | |
|---|---|---|
| 2THETA | d | 100 I/I$_o$ |
| 36.789 | 2.4411 | 11 |
| 40.029 | 2.2506 | 10 |
| 53.828 | 1.7017 | 10 |
| 48.669 | 1.8694 | 10 |
| 52.148 | 1.7525 | 9 |
| 35.649 | 2.5165 | 7 |
| 45.939 | 1.9739 | 7 |
| 51.278 | 1.7802 | 7 |
| 37.899 | 2.3721 | 6 |
| 57.082 | 1.6122 | 6 |
| 12.420 | 7.1211 | 6 |
| 24.969 | 3.5632 | 5 |
| 21.609 | 4.1091 | 5 |
| 57.878 | 1.5919 | 4 |
| 23.529 | 3.7779 | 4 |
| 58.628 | 1.5733 | 4 |

EXAMPLE 4

Preparation of DPZ-2B

Zeolite RHO analog

To a Teflon ® bottle was added 6.98 g 2M Be(NO$_3$)$_2$, 4.72 g 4M H$_3$AsO$_4$, and 5 cc water. To the clear shaken solution was added 10.35 g 4M LiOH rapidly to give initially a gel which on shaking converted to a sludge and then a milky slurry. This reaction mixture was heated to 70° C. for 6.5 hours, cooled and allowed to stand overnight (pH=5.5). 2.2 g of white powder was recovered using the procedure of Example 1. The X-ray diffraction pattern indexed cleanly as a body-centered cube, a=14.059 Å showing its close structural relationship to Zeolite RHO. The X-ray diffraction pattern measured for DPZ-2B is tabulated below in Table D. LOI=16.5% at 250° C., converting to anhydrous LiBeAsO4 at 600° C.

TABLE D

| | DPZ-2B LISTING BY DECREASING INTENSITY | |
|---|---|---|
| 2THETA | d | 100 I/I$_o$ |
| 23.620 | 3.7636 | 100 |
| 8.843 | 9.9916 | 69 |
| 15.394 | 5.7512 | 48 |
| 29.755 | 3.0002 | 47 |
| 32.397 | 2.7613 | 43 |
| 26.844 | 3.3185 | 43 |
| 34.858 | 2.5717 | 31 |
| 19.921 | 4.4534 | 29 |
| 17.796 | 4.9800 | 22 |
| 21.852 | 4.0641 | 16 |
| 38.307 | 2.3478 | 15 |
| 52.835 | 1.7314 | 14 |
| 48.367 | 1.8803 | 14 |
| 37.223 | 2.4136 | 13 |
| 31.047 | 2.8782 | 12 |
| 56.317 | 1.6323 | 11 |
| 41.490 | 2.1747 | 10 |
| 25.226 | 3.5276 | 9 |
| 45.512 | 1.9914 | 9 |
| 43.651 | 2.0719 | 9 |
| 54.426 | 1.6844 | 9 |
| 51.063 | 1.7872 | 8 |
| 53.706 | 1.7053 | 8 |
| 39.450 | 2.2823 | 8 |
| 40.440 | 2.2287 | 8 |

EXAMPLE 5

Preparation of DPZ-3A

To a Teflon ® bottle was added 9.36 g Na$_2$HAsO$_4$.7H$_2$O, 4.283 g 4M NaOH, and 20 cc water. When a clear solution resulted, 13.96 g of 2M Be(NO$_3$)$_2$ was added rapidly. The initial gel transformed to a sludge and then a milky slurry on shaking. After heating for two days at 70° C., the settled white powder was recovered as in Example 1 (pH=3) to yield 4.28 g of crystalline product. The powder diffraction pattern indexed cleanly as body-centered cubic, a=17.262 Å. The X-ray diffraction pattern measured for DPZ-3A is tabulated below in Table E. The LOI was 13.5% and the material became amorphous at 500° C.

TABLE E

| | DPZ-3A LISTING BY DECREASING INTENSITY | |
|---|---|---|
| 2THETA | d | 100 I/I$_o$ |
| 12.542 | 7.0520 | 100 |
| 31.933 | 2.8003 | 96 |
| 21.821 | 4.0697 | 92 |
| 26.299 | 3.3860 | 91 |
| 33.618 | 2.6637 | 41 |
| 29.241 | 3.0517 | 34 |
| 30.162 | 2.9606 | 33 |
| 50.077 | 1.8200 | 29 |
| 24.170 | 3.6792 | 29 |
| 41.136 | 2.1926 | 24 |
| 57.429 | 1.6033 | 23 |
| 20.571 | 4.3140 | 20 |
| 48.867 | 1.8623 | 20 |
| 59.042 | 1.5633 | 20 |
| 36.013 | 2.4919 | 18 |
| 42.506 | 2.1250 | 17 |
| 54.691 | 1.6769 | 17 |
| 37.542 | 2.3938 | 15 |
| 52.423 | 1.7440 | 14 |
| 36.782 | 2.4415 | 13 |
| 19.207 | 4.6172 | 12 |
| 38.275 | 2.3496 | 12 |
| 35.214 | 2.5465 | 10 |
| 23.032 | 3.8585 | 9 |
| 57.992 | 1.5891 | 9 |
| 47.665 | 1.9064 | 8 |
| 55.801 | 1.6461 | 8 |
| 56.912 | 1.6166 | 8 |
| 44.517 | 2.0336 | 8 |
| 25.222 | 3.5281 | 7 |
| 51.251 | 1.7811 | 5 |
| 41.846 | 2.1570 | 5 |
| 58.502 | 1.5764 | 4 |

EXAMPLE 6

Preparation of DPZ-4A

Zeolite Li-ABW Analog

To a Teflon ® bottle was added 6.98 g 2M Be(NO$_3$)$_2$, 4.19 g 4M H$_3$PO$_4$, and 10 cc water. To the clear shaken solution was added 10.08 g 4M LiOH rapidly. The initial gel converted to a loose milky slurry on shaking. After heating overnight at 70° C., 1.3 g of a white powder was recovered as in Example 1 (pH=2.5). The powder diffraction pattern could be indexed cleanly as orthorhombic, a=7.817, b=9.662, c=4.739 Å indicating its structural similarity to Zeolite Li-ABW. The X-ray diffraction pattern measured for DPZ-4A is tabulated below in Table F. TGA showed a total of 13.3% loss to 500° C. in three steps, consistent with one H$_2$O mole per mole of LiBePO$_4$ in the phase.

TABLE F

DPZ-4A
LISTING BY DECREASING INTENSITY

| 2THETA | d | 100 I/I$_o$ |
|---|---|---|
| 29.972 | 2.9789 | 100 |
| 14.567 | 6.0758 | 82 |
| 31.058 | 2.8771 | 69 |
| 21.932 | 4.0493 | 47 |
| 23.792 | 3.7368 | 27 |
| 37.952 | 2.3689 | 25 |
| 24.564 | 3.6211 | 24 |
| 26.326 | 3.3826 | 24 |
| 18.362 | 4.8278 | 21 |
| 55.322 | 1.6593 | 12 |
| 39.470 | 2.2812 | 7 |
| 21.617 | 4.1076 | 7 |
| 43.982 | 2.0571 | 6 |
| 39.272 | 2.2922 | 6 |
| 28.681 | 3.1100 | 6 |
| 49.083 | 1.8546 | 5 |
| 35.662 | 2.5156 | 4 |
| 43.772 | 2.0664 | 4 |
| 22.769 | 3.9024 | 4 |
| 57.172 | 1.6099 | 4 |
| 14.792 | 5.9839 | 3 |
| 45.732 | 1.9823 | 3 |
| 52.353 | 1.7462 | 3 |
| 51.483 | 1.7736 | 3 |
| 46.428 | 1.9542 | 3 |
| 40.923 | 2.2035 | 2 |

EXAMPLE 7

Preparation of DPZ-4B

Zeolite Li-ABW Analog

The procedure of Example 6 was duplicated except that 4.72 g 4M H$_3$AsO$_4$ was used instead of H$_3$PO$_4$ and the overnight heating was at 70° C. (pH=3). The yield was 2.16 g of a white powder with a diffraction pattern indexing cleanly as orthorhombic, a=8.018, b=10.043, c=4.854 Å, indicating structural alliance with Zeolite Li-ABW and the material of Example 6. The X-ray diffraction pattern measured for DPZ-4B is tabulated below in Table G. The LOI showed 10% loss to 275° C., consistent with 1.0 mole of H$_2$O per LiBeAsO$_4$ unit in the phase.

TABLE G

DPZ-4B
LISTING BY DECREASING INTENSITY

| 2THETA | d | 100 I/I$_o$ |
|---|---|---|
| 28.880 | 3.0890 | 100 |
| 14.116 | 6.2691 | 99 |
| 30.225 | 2.9546 | 85 |
| 23.161 | 3.8371 | 60 |
| 21.387 | 4.1514 | 50 |
| 25.502 | 3.4901 | 46 |
| 23.876 | 3.7238 | 45 |
| 37.014 | 2.4267 | 24 |
| 53.465 | 1.7124 | 20 |
| 17.640 | 5.0238 | 19 |
| 20.861 | 4.2548 | 19 |
| 38.115 | 2.3591 | 16 |
| 44.506 | 2.0341 | 14 |
| 38.415 | 2.3414 | 13 |
| 39.651 | 2.2712 | 12 |
| 47.610 | 1.9085 | 11 |
| 54.167 | 1.6919 | 9 |
| 42.508 | 2.1249 | 7 |
| 50.440 | 1.8078 | 7 |
| 22.147 | 4.0106 | 6 |
| 52.607 | 1.7383 | 6 |
| 27.855 | 3.2003 | 6 |
| 49.786 | 1.8300 | 5 |
| 42.856 | 2.1085 | 5 |
| 50.784 | 1.7964 | 5 |
| 34.035 | 2.6320 | 5 |
| 45.199 | 2.0045 | 5 |
| 40.418 | 2.2298 | 5 |
| 54.796 | 1.6739 | 4 |
| 58.877 | 1.5673 | 4 |

EXAMPLE 8

Preparation of DPZ-4C

Zeolite Li-ABW Analog

To a Teflon ® bottle was added 7.76 g 2M Zn(NO$_3$)$_2$, 4.79 g 4M H$_3$PO$_4$, and 10 cc water. After shaking to homogenize the clear solution, 13.61 g 4M LiOH was added rapidly, giving a milky slurry after agitation (pH=8). After heating for 4.5 days at 70° C., recovery of the white powder as in Example 1 yielded 2.63 g of material with a diffraction pattern indexing cleanly as orthorhombic, a=8.114, b=10.506, c=5.020 Å, showing structural alliance with Zeolite Li-ABW and the phases from Examples 6 and 7. The X-ray diffraction pattern measured for DPZ-4C is tabulated below in Table H.

TABLE H

DPZ-4C
LISTING BY DECREASING INTENSITY

| 2THETA | d | 100 I/I$_o$ |
|---|---|---|
| 13.781 | 6.4205 | 100 |
| 29.531 | 3.0224 | 85 |
| 20.782 | 4.2709 | 62 |
| 27.727 | 3.2148 | 54 |
| 35.761 | 2.5088 | 30 |
| 20.123 | 4.4092 | 20 |
| 22.350 | 3.9746 | 12 |
| 33.796 | 2.6501 | 12 |
| 44.621 | 2.0291 | 11 |
| 38.434 | 2.3403 | 11 |
| 16.882 | 5.2477 | 9 |
| 37.739 | 2.3818 | 9 |
| 34.160 | 2.6227 | 9 |
| 33.061 | 2.7073 | 8 |
| 45.841 | 1.9779 | 7 |
| 40.262 | 2.2382 | 7 |
| 51.770 | 1.7644 | 7 |
| 58.452 | 1.5776 | 6 |
| 50.283 | 1.8131 | 5 |
| 24.570 | 3.6202 | 5 |
| 38.731 | 2.3230 | 5 |
| 57.304 | 1.6065 | 5 |
| 50.103 | 1.8192 | 5 |
| 41.363 | 2.1810 | 4 |
| 21.900 | 4.0553 | 4 |
| 23.326 | 3.8104 | 3 |
| 55.504 | 1.6543 | 3 |
| 36.770 | 2.4423 | 3 |
| 41.552 | 2.1716 | 3 |
| 55.354 | 1.6584 | 3 |

EXAMPLE 9

Preparation of DBZ-4D

Zeolite Li-ABW Analog

To a Teflon ® bottle was added 3.88 g 2M Zn(NO$_3$)$_2$, 2.70 g 4M H$_3$AsO$_4$, and 5 cc of water. To the clear shaken solution was then added 6.13 g 4 MLiOH and the slurry again shaken to achieve maximum homogeneity. (pH=7). After standing at ambient conditions for 2 days, 1.34 g of white powder was recovered with a diffraction pattern indexing cleanly as orthorhombic, a=8.289, b=10.816, c=5.56 Å showing similarity to the Li-ABW structures of Examples 6, 7, and 8. The X-ray diffraction pattern measured for DPZ-4D is tabulated below in Table I.

TABLE I

DPZ-4D LISTING BY DECREASING INTENSITY

| 2THETA | d | 100 I/$I_o$ |
|---|---|---|
| 13.444 | 6.5808 | 100 |
| 26.940 | 3.3069 | 55 |
| 28.820 | 3.0953 | 41 |
| 20.266 | 4.3784 | 32 |
| 32.914 | 2.7191 | 23 |
| 16.378 | 5.4081 | 18 |
| 34.767 | 2.5783 | 12 |
| 37.363 | 2.4049 | 10 |
| 21.879 | 4.0590 | 10 |
| 19.574 | 4.5315 | 8 |
| 36.891 | 2.4345 | 8 |
| 44.515 | 2.0337 | 7 |
| 43.654 | 2.0718 | 7 |
| 32.979 | 2.7138 | 7 |
| 22.969 | 3.8689 | 6 |
| 21.425 | 4.1440 | 6 |
| 32.104 | 2.7858 | 6 |
| 32.184 | 2.7791 | 6 |
| 40.594 | 2.2206 | 5 |
| 50.374 | 1.8100 | 5 |
| 50.419 | 1.8085 | 4 |
| 39.078 | 2.3032 | 4 |
| 46.964 | 1.9332 | 4 |
| 33.461 | 2.6758 | 4 |
| 58.145 | 1.5853 | 4 |
| 33.214 | 2.6952 | 3 |
| 53.741 | 1.7043 | 3 |
| 56.915 | 1.6166 | 3 |
| 53.967 | 1.6977 | 3 |
| 39.184 | 2.2972 | 3 |
| 48.710 | 1.8679 | 3 |
| 37.624 | 2.3888 | 2 |
| 12.874 | 6.8708 | 2 |
| 13.054 | 6.7765 | 2 |
| 54.515 | 1.6819 | 2 |
| 44.868 | 2.0185 | 2 |
| 31.924 | 2.8011 | 2 |

EXAMPLE 10

Preparation of DPZ-5A

To a 125 cc Teflon® bottle was added 7.75 g 2M Zn(NO$_3$)$_2$, 4.79 g 4M H$_3$PO$_4$, and 75 cc of water. After shaking, 14.42 g of 4M NaOH was added rapidly and the system thoroughly shaken to give a loose milky slurry (pH=12.5). After 2 days at 70° C., the well-settled solid was recovered as in Example 1 to give 2.20 g of material whose diffraction pattern could be indexed cleanly as primitive cubic, a=15.198 Å with no known zeolite analogue. The X-ray diffraction pattern measured for DPZ-5A is tabulated below in Table J. Heating a portion of the powder to 160° C. overnight resulted in 12% weight loss (complete) and the residue showed complete structure retention.

TABLE J

DPZ-5A LISTING BY DECREASING INTENSITY

| 2THETA | d | 100 I/$I_o$ |
|---|---|---|
| 28.749 | 3.1028 | 100 |
| 35.394 | 2.5340 | 44 |
| 20.211 | 4.3901 | 30 |
| 34.899 | 2.5688 | 18 |
| 23.379 | 3.8019 | 14 |
| 37.379 | 2.4039 | 14 |
| 39.264 | 2.2927 | 13 |

TABLE J-continued

DPZ-5A LISTING BY DECREASING INTENSITY

| 2THETA | d | 100 I/$I_o$ |
|---|---|---|
| 44.554 | 2.0320 | 10 |
| 50.923 | 1.7918 | 10 |
| 55.337 | 1.6589 | 9 |
| 33.317 | 2.6871 | 7 |
| 16.479 | 5.3751 | 5 |
| 45.849 | 1.9776 | 5 |
| 49.387 | 1.8438 | 4 |
| 47.859 | 1.8991 | 4 |
| 52.029 | 1.7563 | 4 |
| 19.329 | 4.5885 | 3 |
| 41.109 | 2.1940 | 3 |
| 42.819 | 2.1102 | 2 |
| 54.939 | 1.6699 | 2 |
| 53.888 | 1.7000 | 2 |
| 30.549 | 2.9240 | 2 |
| 56.787 | 1.6199 | 2 |
| 28.989 | 3.0777 | 2 |
| 52.449 | 1.7432 | 2 |
| 57.789 | 1.5942 | 2 |
| 27.519 | 3.2386 | 2 |

EXAMPLE 11

Preparation of DPZ-5B

To a Teflon® bottle was added 4.08 g KH$_2$PO$_4$, 14.58 g 5M KOH, and 10 cc of water. When the solution was clear and homogeneous, another solution of 7.14 g Zn(NO$_3$)$_2$(6H$_2$O) in 10 cc of water was added rapidly and shaken thoroughly to homogenize the milky slurry. After heating overnight at 50° C., the product was well settled and was recovered in the usual way, yielding 4.56 g. The diffraction pattern of this material indexed cleanly as a primitive cube, a=15.143 Å. The X-ray diffraction pattern measured for DPZ-5B is tabulated below in Table K.

TABLE K

DPZ-5B LISTING BY DECREASING INTENSITY

| 2THETA | d | 100 I/$I_o$ |
|---|---|---|
| 28.796 | 3.0979 | 100 |
| 11.650 | 7.5972 | 90 |
| 35.453 | 2.5299 | 39 |
| 20.241 | 4.3838 | 28 |
| 37.447 | 2.3997 | 19 |
| 34.961 | 2.5644 | 18 |
| 33.378 | 2.6823 | 15 |
| 51.022 | 1.7886 | 15 |
| 39.349 | 2.2879 | 13 |
| 55.408 | 1.6569 | 13 |
| 44.630 | 2.0287 | 10 |
| 14.417 | 6.1388 | 10 |
| 23.419 | 3.7955 | 9 |
| 19.367 | 4.5794 | 9 |
| 49.472 | 1.8409 | 8 |
| 16.501 | 5.3679 | 8 |
| 53.992 | 1.6969 | 8 |
| 41.139 | 2.1924 | 6 |
| 47.121 | 1.9271 | 5 |
| 29.268 | 3.0489 | 4 |
| 27.588 | 3.2307 | 4 |
| 36.474 | 2.4614 | 4 |
| 56.842 | 1.6184 | 4 |

EXAMPLE 12

Preparation of DPZ-5C

To a Teflon® bottle was added 15.52 g 2M Zn(NO$_3$)$_2$ and 8.98 g 4M H$_3$PO$_4$. After shaking to homogenize, 19.47 g 50% RbOH was added rapidly and the bottle shaken to give a homogenous milky slurry (pH=13+) after heating to 70° C. for about 40 hours, the product was recovered as a white powder with a diffraction pattern similar to Examples 10 and 11, with a=15.378 Å. The X-ray diffraction pattern measured for DPZ-5C is tabulated below in Table L.

TABLE L

DPZ-5C
LISTING BY DECREASING INTENSITY

| 2THETA | d | 100 $I/I_o$ |
|---|---|---|
| 11.509 | 7.6825 | 100 |
| 35.032 | 2.5594 | 61 |
| 32.999 | 2.7123 | 51 |
| 20.004 | 4.4350 | 46 |
| 23.147 | 3.8394 | 30 |
| 50.441 | 1.8078 | 25 |
| 37.009 | 2.4270 | 22 |
| 40.690 | 2.2156 | 22 |
| 44.045 | 2.0543 | 19 |
| 37.239 | 2.4126 | 19 |
| 38.769 | 2.3208 | 17 |
| 38.920 | 2.3122 | 16 |
| 53.414 | 1.7140 | 15 |
| 18.156 | 4.8821 | 15 |
| 34.570 | 2.5925 | 14 |
| 29.737 | 3.0019 | 13 |
| 38.980 | 2.3088 | 13 |
| 28.837 | 3.0935 | 12 |
| 48.792 | 1.8649 | 12 |
| 54.588 | 1.6798 | 11 |
| 34.459 | 2.6006 | 11 |
| 54.847 | 1.6725 | 11 |
| 50.653 | 1.8007 | 11 |
| 16.305 | 5.4319 | 10 |
| 55.034 | 1.6673 | 10 |
| 58.936 | 1.5658 | 9 |
| 35.319 | 2.5392 | 9 |

EXAMPLE 13

Preparation of DPZ-5D

To a polypropylene bottle was added 9.44 g 4M $H_3AsO_4$ and 23.07 g 5M KOH. To this clear solution was added rapidly 15.52 g 2M $Zn(NO_3)_2$ and the resulting gel shaken to give a loose milky slurry (pH=13+). After standing two days at ambient conditions, the slurry was well settled but was heated overnight to 70° C. to ensure complete crystallization. The product, a white dense cake, exhibited a diffraction pattern like the above DPZ-5 examples, a=15.446 Å. The X-ray diffraction pattern measured for DPZ-5D is tabulated below in Table M. After heating a sample to 300° C. water loss was complete (8.75%) and the structure was fully retained.

TABLE M

DPZ-5D
LISTING BY DECREASING INTENSITY

| 2THETA | d | 100 $I/I_o$ |
|---|---|---|
| 28.272 | 3.1541 | 100 |
| 19.876 | 4.4634 | 47 |
| 34.813 | 2.5750 | 37 |
| 32.757 | 2.7317 | 32 |
| 38.629 | 2.3289 | 29 |
| 36.757 | 2.4431 | 22 |
| 52.981 | 1.7269 | 14 |
| 50.070 | 1.8203 | 13 |
| 34.317 | 2.6110 | 12 |
| 40.419 | 2.2298 | 12 |
| 54.402 | 1.6851 | 9 |
| 58.507 | 1.5763 | 8 |
| 48.542 | 1.8739 | 6 |
| 55.804 | 1.6461 | 5 |
| 25.770 | 3.4543 | 4 |

TABLE M-continued

DPZ-5D
LISTING BY DECREASING INTENSITY

| 2THETA | d | 100 $I/I_o$ |
|---|---|---|
| 43.826 | 2.0640 | 4 |
| 28.620 | 3.1164 | 3 |
| 35.071 | 2.5566 | 3 |
| 58.264 | 1.5823 | 3 |
| 37.261 | 2.4112 | 3 |
| 27.090 | 3.2889 | 3 |
| 54.153 | 1.6923 | 2 |
| 42.136 | 2.1428 | 2 |
| 37.081 | 2.4225 | 2 |

EXAMPLE 14

Preparation of DPZ-5E $RbH_2AsO_4$ (5.43 g), 12.3 g 50% RbOH and 10 cc of water were added to a Teflon ® bottle to give a clear homogeneous solution. To this was added a clear solution of 7.14 g $Zn(NO_3)_2(6H_2O)$ in 10 cc of water, yielding a thick milky slurry which settled after 2 hours at ambient conditions. Although crystallization seemed complete after 1 day, it was heated to 50° C. for 4 more days to assure completion (pH=11). The product (9.96 g) was recovered by filtration and drying and gave a diffraction pattern like the DPZ-5 materials above, a=15.55 Å. The X-ray diffraction pattern measured for DPZ-5E is tabulated below in Table N.

TABLE N

DPZ-5E
LISTING BY DECREASING INTENSITY

| 2THETA | d | 100 $I/I_o$ |
|---|---|---|
| 27.974 | 3.1869 | 100 |
| 11.411 | 7.7558 | 40 |
| 22.768 | 3.9026 | 37 |
| 34.455 | 2.6009 | 29 |
| 32.415 | 2.7598 | 29 |
| 38.206 | 2.3537 | 19 |
| 36.375 | 2.4679 | 19 |
| 19.677 | 4.5081 | 17 |
| 49.510 | 1.8396 | 16 |
| 52.379 | 1.7453 | 14 |
| 39.976 | 2.2535 | 9 |
| 33.945 | 2.6388 | 8 |
| 53.790 | 1.7028 | 7 |
| 57.826 | 1.5932 | 7 |
| 43.337 | 2.0862 | 5 |
| 59.141 | 1.5609 | 4 |
| 48.013 | 1.8934 | 4 |
| 25.488 | 3.4919 | 3 |
| 55.140 | 1.6643 | 3 |
| 50.958 | 1.7906 | 2 |
| 26.774 | 3.3270 | 2 |
| 44.567 | 2.0314 | 2 |
| 50.598 | 1.8025 | 2 |

EXAMPLE 15

Preparations of DPZ-6A 4.318 g of $KH_2AsO_4$ and 2.64 g of 85% KOH were dissolved in 30 cc of water in a Teflon ® bottle. To this clear solution was added rapidly a solution of 7.14 g $Zn(NO_3)_2(6H_2O)$ in 10 cc of water and the mixture shaken to achieve homogeneity. After standing at room temperature for three days and then heating to 50° C. for two days, the recovered material had a diffraction pattern indexing cleanly as body-centered cubic, a=18.778 Å. This phase seems to have to counterpart in the alumino-silicate zeolites. The X-ray diffraction pattern measured for DPZ-6A is tabulated below in Table O.

TABLE O

| DPZ-6A LISTING BY DECREASING INTENSITY | | |
|---|---|---|
| 2THETA | d | 100 I/$I_o$ |
| 11.589 | 7.6294 | 100 |
| 29.379 | 3.0377 | 81 |
| 30.939 | 2.8880 | 47 |
| 26.919 | 3.3094 | 36 |
| 24.219 | 3.6719 | 30 |
| 34.509 | 2.5969 | 30 |
| 22.269 | 3.9888 | 28 |
| 33.129 | 2.7019 | 25 |
| 44.829 | 2.0202 | 25 |
| 52.598 | 1.7386 | 22 |
| 18.939 | 4.6819 | 14 |
| 45.939 | 1.9739 | 12 |
| 35.199 | 2.5476 | 12 |
| 37.809 | 2.3775 | 10 |
| 32.409 | 2.7603 | 8 |
| 54.038 | 1.6956 | 7 |
| 21.219 | 4.1837 | 7 |
| 20.109 | 4.4121 | 7 |
| 23.259 | 3.8212 | 6 |
| 17.709 | 5.0042 | 6 |
| 57.338 | 1.6056 | 6 |
| 38.409 | 2.3417 | 5 |
| 40.839 | 2.2078 | 4 |
| 50.109 | 1.8190 | 4 |
| 41.439 | 2.1773 | 4 |
| 53.048 | 1.7249 | 4 |
| 55.478 | 1.6550 | 3 |
| 44.289 | 2.0435 | 3 |
| 27.669 | 3.2214 | 3 |
| 56.858 | 1.6180 | 3 |
| 33.819 | 2.6483 | 3 |
| 42.579 | 2.1216 | 3 |
| 53.588 | 1.7088 | 2 |
| 43.149 | 2.0949 | 2 |
| 59.168 | 1.5602 | 2 |
| 54.998 | 1.6683 | 2 |
| 35.859 | 2.5022 | 2 |
| 51.128 | 1.7851 | 2 |

EXAMPLE 16

Preparation of DPZ-7A

Sodalite Analog

To a Teflon® bottle was added 20.93 g 1M $Zn_2H_{11}(PO_4)_5$ (prepared from ZnO and $H_3PO_4$ in a 2/5 mole ratio) and 40 cc of water. To this clear solution was added 21.41 g 4M NaOH. The initial gel was shaken to give a loose milky slurry which settled rapidly. After a day at room temperature, 5.043 g of a loose white powder was recovered possessing a diffraction pattern very similar to the mineral Sodalite (Zeolite HS), primitive cubic, a=8.821 Å. Analysis and LOI at 200° C. are consistent with a unit cell formulation of $Na_6(8H_2O)$ $(ZnPO_4)_6$. The X-ray diffraction pattern measured for DPZ-7A is tabulated below in Table P. At 200° C. the structure converts smoothly to a new anhydrous hexagonal phase.

TABLE P

| DPZ-7A LISTING BY DECREASING INTENSITY | | |
|---|---|---|
| 2THETA | d | 100 I/$I_o$ |
| 24.775 | 3.5907 | 100 |
| 35.275 | 2.5423 | 96 |
| 32.125 | 2.7840 | 83 |
| 14.251 | 6.2101 | 74 |
| 47.424 | 1.9155 | 60 |
| 59.235 | 1.5586 | 47 |
| 38.196 | 2.3543 | 35 |

TABLE P-continued

| DPZ-7A LISTING BY DECREASING INTENSITY | | |
|---|---|---|
| 2THETA | d | 100 I/$I_o$ |
| 20.188 | 4.3951 | 24 |
| 43.547 | 2.0766 | 16 |
| 22.585 | 3.9337 | 12 |
| 52.927 | 1.7286 | 12 |
| 36.757 | 2.4431 | 11 |
| 48.408 | 1.8788 | 10 |
| 46.050 | 1.9694 | 9 |
| 50.694 | 1.7993 | 9 |
| 57.203 | 1.6091 | 8 |
| 35.035 | 2.5592 | 4 |
| 32.346 | 2.7655 | 4 |
| 24.445 | 3.6385 | 2 |

EXAMPLE 17

Preparation of DPZ-7B

Sodalite Analog

To a polypropylene bottle was added 9.36 g $Na_2$-$HAsO_4$ ($7H_2O$) 6.85 g 4M NaOH, and 20 cc water. When all in clear solution, 15.52 g 2M $Zn(NO_3)_2$ was added rapidly and the container shaken well (pH=11). After 3 days at room temperature and a further day at 70° C., 5.95 g of white powder was recovered with a diffraction pattern similar to DPZ-7A, a=9.025 Å. The X-ray diffraction pattern measured for DPZ-7B is tabulated below in Table Q. Analysis and LOI at 200° C. are consistent with a unit cell formulation of $Na_6(8H_2O)$ $(ZnAsO_4)_6$, with the sodalite structure. The material loses water at 200° C. to form the new hexagonal phase, which can be rehydrated to the sodalite form at 100° C.

TABLE Q

| DPZ-7B LISTING BY DECREASING INTENSITY | | |
|---|---|---|
| 2THETA | d | 100 I/$I_o$ |
| 34.388 | 2.6058 | 100 |
| 13.837 | 6.3950 | 88 |
| 24.116 | 3.6873 | 88 |
| 31.298 | 2.8557 | 68 |
| 57.715 | 1.5960 | 39 |
| 37.234 | 2.4129 | 35 |
| 19.641 | 4.5163 | 27 |
| 27.922 | 3.1928 | 27 |
| 42.442 | 2.1281 | 17 |
| 51.580 | 1.7705 | 15 |
| 44.859 | 2.0189 | 10 |
| 49.421 | 1.8427 | 7 |
| 21.984 | 4.0399 | 6 |
| 55.733 | 1.6480 | 6 |
| 39.908 | 2.2572 | 3 |
| 31.538 | 2.8345 | 2 |
| 13.207 | 6.6986 | 2 |
| 23.077 | 3.8510 | 2 |
| 29.948 | 2.9813 | 1 |
| 32.917 | 2.7188 | 1 |
| 45.219 | 2.0036 | 1 |

EXAMPLE 18

Preparation of DPZ-8A

To a Teflon ® bottle was added 7.76 g 2M $Zn(NO_3)_2$, and 4.79 g 4M $H_3PO_4$. To the clear solution was added 14.42 g 4M NAOH and the container shaken to give a thick milky slurry. After heating to 70° C. for overnight, the solids were well settled and were recovered as in Example 1 yielding 2.29 g of white powder (pH=12.5). The diffraction pattern of this material could be indexed cleanly as hexagonal, a=10.455, c=15.104 Å, having no obvious zeolite analog. The X-ray diffraction pattern measured for DPZ-8Z is tabulated below in Table R. The phase loses water in two steps; 6% to 175° C. with structure retention and a further 4% at 275° C. with conversion to anhydrous $NaZnPO_4$.

These results indicate a water content of 1.13 moles per $NaZnPO_4$ in the open structure.

TABLE R
DPZ-8A
LISTING BY DECREASING INTENSITY

| 2THETA | d | 100 $I/I_o$ |
|---|---|---|
| 11.387 | 7.7648 | 100 |
| 31.907 | 2.8025 | 74 |
| 11.597 | 7.6247 | 59 |
| 26.657 | 3.3414 | 45 |
| 34.247 | 2.6162 | 43 |
| 16.937 | 5.2308 | 39 |
| 29.537 | 3.0218 | 33 |
| 35.387 | 2.5345 | 29 |
| 29.237 | 3.0521 | 28 |
| 20.687 | 4.2903 | 26 |
| 9.767 | 9.0489 | 17 |
| 28.727 | 3.1051 | 16 |
| 22.877 | 3.8842 | 15 |
| 31.612 | 2.8280 | 15 |
| 15.317 | 5.7802 | 14 |
| 50.388 | 1.8096 | 12 |
| 47.478 | 1.9135 | 11 |
| 31.305 | 2.8550 | 10 |
| 52.208 | 1.7507 | 9 |
| 43.948 | 2.0586 | 8 |
| 39.810 | 2.2625 | 5 |

EXAMPLE 19

Preparation of DPZ-9A

To a 125 cc Teflon® bottle was added 47.17 g $Na_2HPO_4$ ($7H_2O$), 4.16 g NaOH pellets and 14.8 cc water. The contents were heated to 100° C. to effect solution, and 7.76 g 2M $Zn(NO_3)_2$ was added to give a faintly cloudy suspension. After a heating period of 10 days at 50°–70° C., (pH=12.5), the suspension was well crystallized and was recovered with the usual technique. The yield was 2.7 g of small clear crystals with a diffraction pattern indexing as a primitive cube, a=11.947 Å. The X-ray diffraction pattern measured for DPZ-9A is tabulated below in Table S. It loses 11% water to 500° C. and a different crystalline phase is formed.

TABLE S
DPZ-9A
LISTING BY DECREASING INTENSITY

| 2THETA | d | 100 $I/I_o$ |
|---|---|---|
| 18.183 | 4.8751 | 100 |
| 33.513 | 2.6718 | 88 |
| 35.223 | 2.5459 | 47 |
| 36.843 | 2.4376 | 46 |
| 27.933 | 3.1916 | 40 |
| 29.913 | 2.9847 | 37 |
| 55.413 | 1.6567 | 15 |
| 57.693 | 1.5966 | 12 |
| 46.833 | 1.9383 | 12 |
| 21.003 | 4.2264 | 11 |
| 56.553 | 1.6260 | 10 |
| 49.383 | 1.8440 | 6 |
| 53.073 | 1.7241 | 6 |
| 54.243 | 1.6897 | 6 |
| 23.552 | 3.7743 | 6 |
| 51.873 | 1.7612 | 6 |
| 41.373 | 2.1806 | 4 |
| 38.390 | 2.3429 | 4 |

TABLE S-continued
DPZ-9A
LISTING BY DECREASING INTENSITY

| 2THETA | d | 100 $I/I_o$ |
|---|---|---|
| 44.163 | 2.0491 | 4 |
| 32.673 | 2.7386 | 3 |
| 39.153 | 2.2990 | 3 |
| 48.783 | 1.8653 | 2 |
| 35.343 | 2.5376 | 2 |
| 58.803 | 1.5691 | 2 |
| 22.323 | 3.9794 | 1 |
| 12.821 | 6.8992 | 1 |
| 26.882 | 3.3138 | 1 |
| 35.043 | 2.5586 | 1 |
| 51.260 | 1.7808 | 1 |

EXAMPLE 20

Preparation of DPZ-10A

To a polypropylene bottle was charged 9.706 g 4M NaOH and 4.14 g 5M KOH. After mixing, 14.55 g of 0.5M $Zn_2H_{11}$ $(PO_4)_5$ (see Example 16) was added rapidly and the resulting gel shaken to give a milky slurry (pH=11.5). After an initial formation of a DPZ-5 phase, heating the reaction mixture for 84 hours at 70° C. yielded 2.67 g of a white powder with a diffraction pattern which could be indexed as tetragonal, a=17.091, c=18.342 Å. The X-ray diffraction pattern measured for DPZ-10A is tabulated below in Table T. Heating the dry powder to 300° C. gave complete loss of water (10.5%) and a different crystalline phase appeared.

TABLE T
DPZ-10A
LISTING BY DECREASING INTENSITY

| 2THETA | d | 100 $I/I_o$ |
|---|---|---|
| 4.707 | 18.7585 | 100 |
| 28.211 | 3.1607 | 11 |
| 29.815 | 2.9942 | 9 |
| 12.044 | 7.3424 | 8 |
| 28.662 | 3.1120 | 7 |
| 35.812 | 2.5054 | 7 |
| 32.115 | 2.7848 | 6 |
| 37.449 | 2.3996 | 6 |
| 29.563 | 3.0192 | 6 |
| 24.732 | 3.5969 | 6 |
| 25.272 | 3.5212 | 6 |
| 15.324 | 5.7774 | 6 |
| 22.553 | 3.9393 | 5 |
| 30.433 | 2.9349 | 5 |
| 27.916 | 3.1935 | 5 |
| 20.081 | 4.4183 | 4 |
| 12.522 | 7.0631 | 4 |
| 26.322 | 3.3831 | 4 |
| 11.381 | 7.7684 | 4 |
| 34.213 | 2.6187 | 4 |
| 33.883 | 2.6435 | 4 |
| 40.483 | 2.2264 | 4 |
| 21.748 | 4.0832 | 3 |
| 31.392 | 2.8473 | 3 |
| 33.583 | 2.6664 | 3 |
| 26.637 | 3.3438 | 3 |
| 35.023 | 2.5600 | 3 |
| 18.682 | 4.7459 | 3 |
| 34.633 | 2.5879 | 3 |
| 38.228 | 2.3524 | 3 |
| 17.124 | 5.1740 | 3 |
| 36.253 | 2.4759 | 3 |
| 45.434 | 1.9947 | 3 |
| 36.152 | 2.4826 | 2 |
| 39.193 | 2.2967 | 2 |
| 31.663 | 2.8236 | 2 |
| 48.344 | 1.8812 | 2 |
| 34.843 | 2.5728 | 2 |
| 50.655 | 1.8006 | 2 |

TABLE T-continued

DPZ-10A
LISTING BY DECREASING INTENSITY

| 2THETA | d | 100 I/I$_o$ |
|---|---|---|
| 47.504 | 1.9124 | 2 |
| 14.232 | 6.2183 | 2 |
| 26.082 | 3.4137 | 2 |
| 23.502 | 3.7823 | 2 |
| 30.993 | 2.8830 | 2 |
| 57.701 | 1.5964 | 2 |
| 54.475 | 1.6830 | 1 |
| 45.183 | 2.0051 | 1 |

EXAMPLE 21

Preparation of DPZ-11A

To a Teflon ® bottle was added 4.79 g 4M H$_3$PO$_4$, 6.28 g 4M NaOH, and 4.509 g 50% RbOH. To the clear solution was then added 7.76 g 2M Zn(NO$_3$)$_2$ rapidly and the gel shaken to form a very stiff paste, which loosened slowly. After holding at room conditions overnight, (30% settled) the mixture was heated at 70° C. for 45 hours and recovered in the usual way (pH=10). The yield was 2.90 g of white powder which had a diffraction pattern indexing well as tetragonal, a=9.699, c=13.375 Å. The X-ray diffraction pattern measured for DPZ-11A is tabulated below in Table U. The material loses 6.2% water to 300° C. and converts to another crystalline phase.

TABLE U

DPZ-11A
LISTING BY DECREASING INTENSITY

| 2THETA | d | 100 I/I$_o$ |
|---|---|---|
| 12.901 | 6.8566 | 100 |
| 32.131 | 2.7835 | 41 |
| 29.311 | 3.0446 | 37 |
| 20.461 | 4.3370 | 29 |
| 25.981 | 3.4267 | 24 |
| 29.851 | 2.9907 | 19 |
| 33.991 | 2.6353 | 12 |
| 55.231 | 1.6618 | 9 |
| 43.231 | 2.0911 | 7 |
| 53.431 | 1.7134 | 6 |
| 18.301 | 4.8438 | 6 |
| 38.264 | 2.3503 | 6 |
| 39.571 | 2.2756 | 5 |
| 33.331 | 2.6860 | 5 |
| 29.161 | 3.0599 | 5 |
| 40.681 | 2.2161 | 4 |
| 55.643 | 1.6505 | 3 |
| 47.539 | 1.9111 | 3 |
| 37.051 | 2.4244 | 2 |
| 44.941 | 2.0154 | 2 |

EXAMPLE 22

Preparation of DPZ-12A

To a 60 cc polypropylene bottle was added 1.273 g V$_2$O$_5$, 9.22 g 5M KOH and 15 cc water. When all was in solution, 7.66 g 2M Co(NO$_3$)$_2$ was added and the resultant gel was shaken thoroughly to produce a loose dark brown sludge (pH=7). After heating for 12 days at 70° C., about 2.1 g of a red-brown powder was recovered via filtration and drying. The major component of the diffraction pattern could be indexed as a body-centered cube, a=10.2 Å. The X-ray diffraction pattern measured for DPZ-12A is tabulated below in Table V. The powder lost 8% water in two equal steps (200° and 400° C.) and the residue indicated that the original structure had been lost.

TABLE V

DPZ-12A
LISTING BY DECREASING INTENSITY

| 2THETA | d | 100 I/I$_o$ |
|---|---|---|
| 30.057 | 2.9707 | 100 |
| 34.767 | 2.5783 | 76 |
| 12.205 | 7.2461 | 66 |
| 32.542 | 2.7493 | 51 |
| 17.250 | 5.141 | 48 |
| 53.397 | 1.7145 | 46 |
| 37.047 | 2.4247 | 36 |
| 21.147 | 4.1980 | 29 |
| 39.447 | 2.2825 | 25 |
| 50.337 | 1.8113 | 24 |
| 52.047 | 1.7557 | 22 |
| 41.157 | 2.1915 | 20 |

EXAMPLE 23

Preparation of DPZ-12B

To a Teflon ® bottle was added 1.273 g V$_2$O$_5$, 8.98 g 5M KOH, and 15 cc water. To the clear solution was then added 7.76 g 2M Zn(NO$_3$)$_2$ to form a light yellow gel. Thorough shaking of the reaction mixture converted the gel to a milky slurry with the same color (pH=12). Heating the bottle at 70° C. for 2 days destroyed the color, and the well-settled white powder was filtered off and recovered (2.16 g). The X-ray diffraction pattern of the product indexed well as a body-centered cube, a=10.33 Å, indicating a structural similarity to DPZ-12A, but without any obvious Zeolite analog. The X-ray diffraction pattern measured for DPZ-12B is tabulated below in Table W.

TABLE W

DPZ-12B
LISTING BY DECREASING INTENSITY

| 2THETA | d | 100 I/I$_o$ |
|---|---|---|
| 12.159 | 7.2730 | 100 |
| 30.001 | 2.9761 | 55 |
| 51.573 | 1.7707 | 12 |
| 21.031 | 4.2208 | 9 |
| 32.371 | 2.7634 | 8 |
| 36.782 | 2.4415 | 8 |
| 34.652 | 2.5866 | 8 |
| 17.130 | 5.1721 | 6 |
| 24.511 | 3.6289 | 6 |
| 53.002 | 1.7263 | 4 |

EXAMPLE 24

Preparation of DPZ-13A

To a Teflon ® bottle was added 6.85 g 4M NaOH and 14.18 g 1M NaVO$_3$. After shaking to homogenize the clear solution, 7.76 g 2M Zn(NO$_3$)$_2$ was added and the resulting gel was shaken to yield a light yellow milky slurry (pH=11). Heating this slurry at 70° C. for 4 days yielded 1.660 g of a white powder which had a diffraction pattern indexable cleanly as hexagonal, a=6.14, c=7.15 Å, with no obvious Zeolite analog. The X-ray diffraction pattern measured for DPZ-13A is tabulated below in Table X.

TABLE X

DPZ-13A
LISTING BY DECREASING INTENSITY

| 2THETA | d | 100 I/I$_o$ |
|---|---|---|
| 12.350 | 7.1391 | 100 |
| 30.059 | 2.9705 | 50 |
| 33.739 | 2.6544 | 45 |
| 36.045 | 2.4897 | 35 |

TABLE X-continued

DPZ-13A
LISTING BY DECREASING INTENSITY

| 2THETA | d | 100 I/I$_o$ |
|---|---|---|
| 20.849 | 4.2572 | 19 |
| 16.676 | 5.3118 | 18 |
| 31.697 | 2.8206 | 16 |
| 51.519 | 1.7725 | 16 |
| 29.102 | 3.0660 | 14 |
| 42.189 | 2.1403 | 14 |
| 52.165 | 1.7520 | 12 |
| 38.596 | 2.3308 | 11 |
| 46.899 | 1.9357 | 10 |

Particular embodiments of the invention are included in the examples. Other embodiments will become apparent to those skilled in the art from a consideration of the specification or practice of the invention disclosed herein. It is understood that modification and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A process for the production of molecular sieves wherein both silicon and aluminum are essentially absent comprising the steps of: (a) forming a mixture consisting essentially of reactive sources of $M_{2/x}O$, AO, $T_2O_5$ and water, wherein M is selected from the group consisting of alkali metals, alkaline earth metals and ammonium, A is selected from the group consisting of beryllium, cobalt and zinc, T is selected from the group consisting of phosphorous, arsenic and vanadium, and x is the average ionic charge of M in the mixture, wherein said M, A and T are present in the approximate proportions expressed in terms of a molar ratio of oxides as 0.5–3 $M_{2/x}O$:AO:0.5–3 $T_2O_5$, and wherein said mixture contains from about 10 to about 200 moles of water per mole of A; and (b) crystallizing the mixture of at a temperature from the freezing point of the mixture to 90° C. for a period of time sufficient to form a molecular sieve composition containing M, A, T and oxygen.

2. The process as recited in claim 1 wherein said M is one or more alkali metals or ammonium.

3. The process as recited in claim 1 wherein said M is an alkali metal.

4. The process as recited in claim 1 wherein said T is one of phosphorous, arsenic or vanadium.

5. The process as recited in claim 1 wherein said temperature is about 0° C. to about 70° C.

6. The process as recited in claim 1 wherein said A is one of beryllium, cobalt or zinc.

7. A process for the production of molecular sieves wherein both silicon and aluminum are essentially absent comprising the steps of: (a) forming a mixture consisting essentially of reactive sources of $M_{2/x}O$, AO, $T_2O_5$ and water, wherein M is selected from the group consisting of alkali metals, alkaline earth metals and ammonium, x is the average ionic charge of M in the mixture, A is selected from the group consisting of beryllium, cobalt and zinc, and T is selected from the group consisting of phosphorous, arsenic and vanadium, provided that when A is beryllium, T is not phosphorous, wherein said M, A and T are present in the approximate proportions expressed in terms of a molar ratio of oxides as 0.5–3 $M_{2/x}O$:AO:0.5–3 $T_2O_5$, and wherein said mixture contains from about 10 to about 200 moles of water per mole of A; and (b) crystallizing the mixture at a temperature from the freezing point of the mixture to 90° C. for a period of time sufficient to form a molecular sieve composition containing M, A, T and oxygen.

8. The process as recited in claim 7 wherein said temperature is about 0° C. to about 70° C.

9. The process as recited in claim 7 wherein said M is one or more alkali metals or ammonium.

10. The process as recited in claim 9 wherein said T is one of phosphorous, arsenic or vanadium.

11. The process as recited in claim 9 wherein said A is one of beryllium, cobalt or zinc.

12. The process as recited in claim 11 wherein said T is one of phosphorous, arsenic or vanadium.

13. The process as recited in claim 12 wherein said temperature is about 0° C. to about 70° C.

14. A molecular sieve composition wherein both silicon and aluminum are essentially absent which is the product of a process comprising the steps of: (a) forming a mixture consisting essentially of reactive sources of $M_{2/x}O$, AO, $T_2O_5$ and water, wherein M is selected from the group consisting of alkali metals, alkaline earth metals and ammonium, A is selected from the group consisting of beryllium, cobalt and zinc, T is selected from the group consisting of phosphorous, arsenic and vanadium, and x is the average ionic charge of M in the mixture, wherein said M, A and T are present in the approximate proportions expressed in terms of a molar ratio of oxides as 0.5–3 $M_{2/x}O$:AO:0.5–3 $T_2O_5$, and wherein said mixture contains from about 10 to about 200 moles of water per mole of A; and (b) crystallizing the mixture at a temperature from the freezing point of the mixture to 90° C. for a period of time sufficient to form a molecular sieve composition containing M, A, T and oxygen; wherein (i) A is selected from cobalt and zinc, (ii) T is selected from arsenic and vanadium, or (iii) the molecular sieve is a beryllophosphate which has a characteristic X-ray powder diffraction pattern containing at least the d-spacings and about the relative intensities of Table A or Table F or is a structural analogue of said berllophosphates.

15. The molecular sieve composition of claim 14 which has the X-ray diffraction pattern containing at least the d-spacings and about the relative intensities of Table A, Table B, Table C, Table D, Table E, Table F, Table G, Table H, Table I, Table J, Table K, Table L, Table M, Table N, Table O, Table P, Table Q, Table R, Table S, Table T, Table U, Table V, Table W or Table X.

16. A crystalline molecular sieve wherein both silicon and aluminum are essentially absent composition having the approximate formula $M(ATO_4)_x \cdot yH_2O$), wherein M is selected from the group consisting of alkali metals, alkaline earth metals and ammonium, A is selected from the group consisting of beryllium, cobalt and zinc, T is selected from the group consisting of phosphorous, arsenic and vanadium, x is the average ionic charge of said M, and y is from zero to about 10; provided that when A is beryllium, T is not phosphorous.

17. The composition as recited in claim 16 wherein said T is one of phosphorous, arsenic or vanadium.

18. The composition as recited in claim 16 wherein said A is one of beryllium, cobalt or zinc.

19. The composition as recited in claim 16 wherein said M is one or more alkali metals or ammonium.

20. The composition as recited in claim 19 wherein said M is an alkali metal.

21. The composition as recited in claim 16 which is a composition having an X-ray powder diffraction pattern containing at least the d-spacings and about the relative intensities of Table B, Table C, Table D, Table E, Table G, Table H, Table I, Table J, Table K, Table L, Table M, Table N, Table O, Table P, Table Q, Table R, Table S, Table T, Table U, Table V, Table W or Table X; or is a structural analogue of a composition having said X-ray powder diffraction pattern.

22. The composition as recited in claim 16 which is a structural analogue of Zeolite X.

23. The composition as recited in claim 16 which is a structural analogue of Zeolite RHO.

24. The composition as recited in claim 16 which is a structural analogue of Zeolite Li-ABW.

25. The composition as recited in claim 16 which is a structural analogue of Sodalite.

26. The composition as recited in claim 16 which is a body-centered cubic crystalline composition having an X-ray powder diffraction pattern containing at least the d-spacings and about the intensities of Table E, Table O or Table V; or is a structural analogue of a composition having said X-ray powder diffraction pattern.

27. The composition as recited in claim 16 which is a primitive cubic crystalline composition having an X-ray powder diffraction pattern containing at least the d-spacings and about the relative intensities of Table J or Table S; or is a structural analogue of a composition having said X-ray diffraction pattern.

28. The composition as recited in claim 16 which is a hexagonal crystalline composition having an X-ray powder diffraction pattern containing at least the d-spacings and about the relative intensities of Table X or Table R; or is a structural analogue of a composition having said X-ray diffraction pattern.

29. The composition as recited in claim 16 which is a tetragonal crystalline composition having an X-ray powder diffraction pattern containing at least the d-spacings and about the relative intensities of Table T or Table U; or is a structural analogue of a composition having said X-ray diffraction pattern.

30. A crystalline alkali metal, alkali earth metal or ammonium beryllophosphate molecular sieve composition wherein both silicon and aluminum are essentially absent, which is a composition having a X-ray powder diffraction pattern containing at least the d-spacings and about the relative intensities of Table A or Table F; or is a structural analogue of a composition having said X-ray powder diffraction pattern.

31. The crystalline beryllophosphate molecular sieve composition as recited in claim 30 which has an X-ray powder diffraction pattern containing at least the d-spacings and about the relative intensities of Table A.

32. The crystalline beryllophosphate molecular sieve composition as recited in claim 30 which has an X-ray powder diffraction pattern containing at least the d-spacings and about the relative intensities of Table F.

* * * * *